(No Model.)
D. ARTHUR.
ROPE DRIVING DEVICE.
No. 537,558. Patented Apr. 16, 1895.
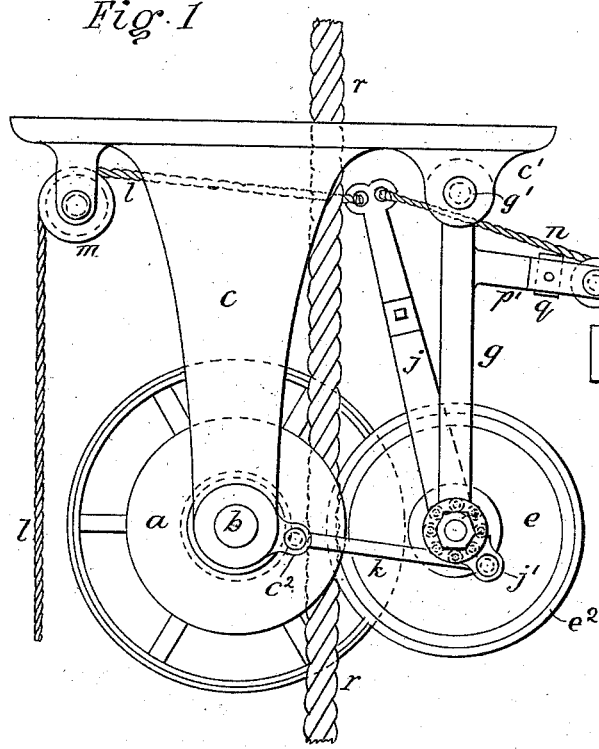
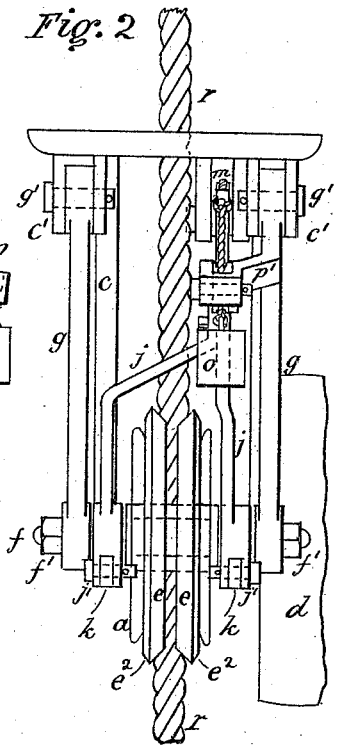
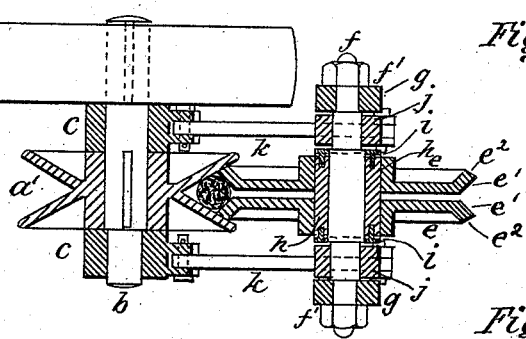
Witnesses
Daniel Arthur, Inventor
By his Attorney
Alfred Shedlock

UNITED STATES PATENT OFFICE.

DANIEL ARTHUR, OF JERSEY CITY, NEW JERSEY.

ROPE-DRIVING DEVICE.

SPECIFICATION forming part of Letters Patent No. 537,558, dated April 16, 1895.

Application filed May 10, 1894. Serial No. 510,734. (No model.)

*To all whom it may concern:*

Be it known that I, DANIEL ARTHUR, a citizen of the United States, and a resident of Jersey City, county of Hudson, State of New Jersey, have invented certain new and useful Improvements in Rope-Driving Devices, of which the following is a specification.

The rope driving device forming the subject of this invention involves a new principle in the construction and operation of grooved gripping pulleys, whereby the gripping space formed by the grooves of two pulleys is reduced in two directions when the rope is gripped, the construction being such that both the pulleys are driven when set to act on the rope between them with the source of power connected only to one of the pulleys, this driven pulley at such times then imparting motion to the other pulley and at the same time causing or assisting it to perform its share of the gripping and hauling power. To accomplish this, one of the pulleys is composed of two circular parts arranged side by side and mounted freely on a shaft and having inclined inner and outer edges and the other pulley is formed with a groove sufficiently large to embrace the outer inclined edge of the divided pulley. The bearings of one of the pulleys are adapted to be moved toward and from the bearings of the other pulley so that the gripping space between the two pulleys may be varied. When the pulleys are pressed together the gripping faces of the divided pulley are pressed firmly against the rope and press the rope firmly into the groove of the solid pulley. At the same time the two pulleys are by frictional contact caused to move together when motive power is applied to one of them.

To more fully describe my invention I will refer to the accompanying drawings, which illustrate one of its applications, and in which—

Figure 1 is a side elevation of a machine for operating the hand rope of elevators by power. Fig. 2 is an end elevation of the same. Fig. 3 is a horizontal section of the gripping and driving device. Fig. 4 is a modification of the same.

The pulley $a$, which in the main views is shown as the driven pulley, is provided with a deep groove $a'$ and is rigidly secured by a key, or otherwise, to the shaft $b$, which is journaled in the lower ends of the parts $c, c,$ of the frame. To the outer end of this shaft $b$ is keyed or otherwise secured, the driving pulley $d$. The other gripping pulley is composed of two similar parts $e\,e$ mounted freely on the shaft $f$, so as to have longitudinal play thereon, said shaft being rigidly secured by the nuts $f'\,f'$ to the lower end of the links $g\,g$, which are pivoted by pins or bolts $g'\,g'$ in lugs $c'\,c'$ of the frame. It is preferable to supply the pulley $e\,e$ with an anti-friction bearing, and for this purpose a series of rollers $h\,h$ are placed between the bores of the pulley and the shaft $f$ and are held in position by the rings $i\,i$, which are provided with studs acting as guide bearings for the rollers by entering holes formed in the ends of them. This arrangement admits of free longitudinal movement of the two parts $e\,e$ and also assists in causing the two parts to move together by reason of the roller bearings $h\,h$ being common to both. The shaft $f$ is free to be moved to and from the shaft $b$, and to control this action a lever $j$ is by its two branches seated or journaled on the shaft $f$ between the bearing of the pulley $e\,e$ and the links $g\,g$, and is connected by the links $k\,k$ to the parts $c\,c$ of the frame, one of the ends of said links being pivoted to the horns $c^2\,c^2$ and the other ends to the short arms $j'\,j'$ of the lever $j$, these lever pivotal connections being so arranged in relation to the axis upon which the lever turns that the applied power to the lever acts with greater force as the space between the gripping faces of the pulleys $a$ and $e\,e$ is reduced to cause the pulleys to grip the rope. To the upper end of the lever $j$ is fastened one end of the rope $l$ which passes over the guide pulley $m$ carried by the frame, and down through the various floors of the buildings in which the elevator is placed; and also to the upper end of the lever at the other side thereof is fastened a cord or rope $n$ to which is secured the counter weight $o$. Said rope passes over the guide pulley $p$ carried by the arm $p'$ which projects from one of the links $g\,g$. This arm $p'$ also carries a buffer stop $q$, of india-rubber or other suitable material, against which the lever $j$ strikes, when brought back by the weight $o$, to release the hauling rope $r$ from the gripping pulleys. Now as clearly shown in the drawings the groove of the pulley $e$ is formed by the inner inclined edges $e'\,e'$, and this groove is variable in size as the parts $e\,e$ are free to move laterally toward or from one another, they being caused to approach one another by their outer frictional contact edges $e^2\,e^2$ acting against the sides of the groove $a'$ in the wheel $a$, the inclination of the edges $e^2\,e^2$ corresponding with that of the groove $a'$. From this construction, it will be seen that with only one of the gripping pulleys primarily driven, the hauling rope $r$ is gripped and acted upon by the two pulleys as perfectly as it would be if power were applied directly to the two pulleys, for the act of pressing the pulley $e\,e$ into the groove of the pulley $a$ forces the edges $e'\,e'$ against the rope by the inclined edges $e^2\,e^2$ wedging into the groove $a'$, and this gripping of the rope may be made as hard as desired by changing the angle contained between the faces of the groove $a'$. I find in practice that it is preferable to make the wedging angle of the groove $a'$ more acute than the rope gripping angles. They may in some cases be alike or may be varied as described.

Driving power may be applied to the divided pulley as shown at Fig. 4, in which $e^3\,e^3$ is the driven pulley, the two parts being held to shaft $b$ so as to rotate therewith by a spline or feather but left free to move longitudinally thereon. The solid pulley $a^2$ is shown with its gripping groove $a^3$ having the same inclination as the gripping edges $e^4\,e^4$ of the pulley $e^3\,e^3$, which in this case is forty-five degrees, and the angles of its wedging faces $a^4\,a^4$ more acute, said faces being offset from the sides of the groove $a^3$ so that the points of contact of the edges $e^5\,e^5$ of the pulley $e^3\,e^3$ and of the faces $a^4\,a^4$ having practically equal velocities bear the same ratios to the velocities of the points of contact of the faces of the gripping groove $e^4$, and $a^3$, which are consequently equal to one another. These pulleys are shown of about equal diameters.

The relative diameters of the pulleys may be changed and varied as desired, one of the advantages of the construction being that the driven grooved pulley may be made comparatively small to the size of the driving pulley $d$, so that the intervention of counter shafts and pulleys, or other speed reducing devices may be avoided between this rope driving device and high speed motors or driving shafts. Another advantage is that irregularities in the rope pass between the pulleys without perceptible shock, this method of gripping and driving ropes being so flexible in its action that a hauling rope made of sections of different size ropes is acted on perfectly. The changes readily occur to cause it to grip different sizes of ropes.

Rods, bars or ropes may be hauled or driven for any purpose by means of this invention.

I claim as my invention—

1. In a rope driving device, the combination of a solid groove pulley, a divided groove pulley, the outer edges of the two parts of which are formed to bear against the sides of the groove of the solid pulley and the inner edges of which are beveled to form the groove, and a rope embraced and driven by the grooves of the two pulleys.

2. In a rope driving device, the combination of a rope, two grooved pulleys, and their shafts, one of said pulleys being solid and having a deep groove, and the other one formed of two similar parts mounted freely on its shaft, the two parts having their outer edges formed to bear in the groove of the solid pulley and their inner edges beveled, whereby one of the pulleys is caused to rotate by frictional contact with the other one and four points of driving contact applied to the rope gripped between them, and a driving pulley secured to one of the shafts.

3. In a rope driving device, the combination of a solid groove pulley, a divided groove pulley the outer edges of the two parts of which are formed to bear against the sides of the groove of the solid pulley and the inner edges of which are beveled to form the groove, the angle contained between the sides of the groove of the solid pulley being less than the angle contained between the sides of the groove of the divided pulley, and a rope embraced and driven by the grooves of the two pulleys.

4. In a rope driving device, the combination of a solid groove pulley, a divided groove pulley, the outer edges of the two parts of which are formed to bear against the sides of the groove of the solid pulley and the inner edges of which are beveled to form the groove, a rope embraced and driven by the grooves of the two pulleys, a shaft to which the solid pulley is secured, a driving pulley secured to this shaft, a shaft upon which the divided pulley is freely mounted, and means for varying the gripping space between the pulleys.

5. In a rope driving device, the combination of a solid groove pulley, a divided groove pulley, the outer edges of two parts of which are formed to bear against the sides of the groove of the solid pulley and the inner edges of which are beveled to form the groove, a rope embraced and driven by the grooves of the two pulleys, a frame having stationary bearings, a shaft journaled in said bearings, on which one of the pulleys is mounted so as to rotate therewith, a driving pulley on this shaft, two links pivoted to the frame, a shaft carried by these links and on which the other grooved pulley is mounted, and means for moving the links.

6. In a rope driving device, the combination of a solid groove pulley, a divided groove pulley, the outer edges of the two parts of which are formed to bear against the sides of the groove of the solid pulley and the inner edges of which are beveled to form the groove, a rope embraced and driven by the grooves of the two pulleys, a shaft to which the solid pulley is secured, a driving pulley secured to this shaft, a shaft upon which the divided pulley is freely mounted, a series of rollers arranged between the bores of the divided pulley and its shaft, roller controlling plates or rings at the ends of the rollers and having studs projecting into holes formed in their ends, and means for varying the gripping space between the pulleys.

7. In a rope driving device, the combination of a solid groove pulley, a divided groove pulley, the outer edges of the two parts of which are formed to bear against the sides of the groove of the solid pulley and the inner edges of which are beveled to form the groove, a rope embraced and driven by the grooves of the two pulleys, a frame having stationary bearings, a shaft journaled in said bearings on which one of the grooved pulleys is mounted, so as to rotate therewith, a driving pulley on this shaft, two hanging links pivoted to the frame, a shaft carried by these links, on which the other grooved pulley is mounted, a lever journaled on the shaft carried by the links, links connecting the lower ends of this lever to the frame, and a rope fastened to the upper end of this lever, whereby it is operated to vary the gripping space between the pulleys.

8. In a rope driving device, the combination of a frame, having stationary bearings, a shaft journaled in said bearings, a grooved pulley mounted on this shaft, so as to rotate therewith, a driving pulley on this shaft, two hanging links pivoted to the frame, a shaft carried by these links, a grooved pulley mounted on this shaft, a lever journaled on the shaft carried by the links, links connecting the lower ends of this lever to the frame, a rope fastened to the upper end of this lever, whereby it is operated to vary the gripping space between the pulleys, a counter-weight attached to the lever, and a rope embraced and driven by the grooves of the pulleys.

9. In a rope driving device, the combination of a solid groove pulley, a divided groove pulley, the outer edges of the two parts of which are formed to bear against the sides of the groove of the solid pulley and the inner edges of which are beveled to form the groove, a rope embraced and driven by the grooves of the two pulleys, a frame having stationary bearings, a shaft journaled in said bearings on which one of the grooved pulleys is mounted, so as to rotate therewith, a driving pulley on this shaft, two hanging links pivoted to the frame, a shaft carried by these links, on which the other grooved pulley is mounted, a lever journaled on the shaft carried by the links, links connecting the lower ends of this lever to the frame, a rope fastened to the upper end of this lever, whereby it is operated to vary the gripping space between the pulleys, a counter-weight attached to the lever, and a spring buffer stop against which the lever strikes.

In testimony that I claim the foregoing as my invention I have signed my name, in presence of two witnesses, this 7th day of May, 1894.

DANIEL ARTHUR.

Witnesses:
 ALFRED SHEDLOCK,
 BESSIE ARTHUR.